F. A. NELSON.
CAR FENDER.
APPLICATION FILED DEC. 23, 1907.
919,451.
Patented Apr. 27, 1909.
2 SHEETS—SHEET 1.
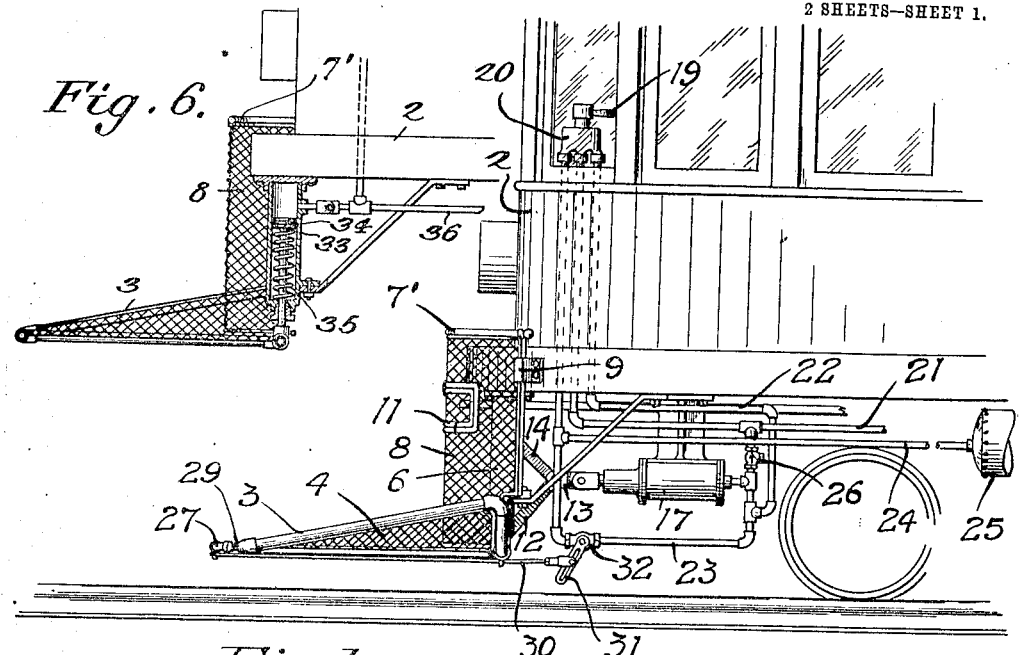
Fig. 6.
Fig. 1.
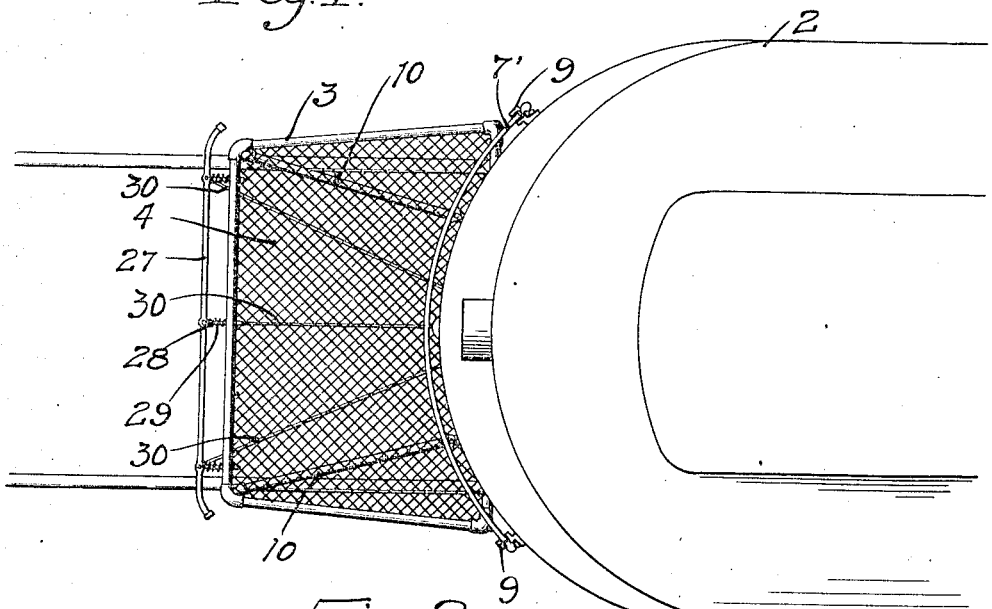
Fig 2.
WITNESSES
INVENTOR
FRANK A. NELSON
BY Paul & Paul
HIS ATTORNEYS F. A. NELSON.
CAR FENDER.
APPLICATION FILED DEC. 23, 1907.
919,451.
Patented Apr. 27, 1909.
2 SHEETS—SHEET 2.
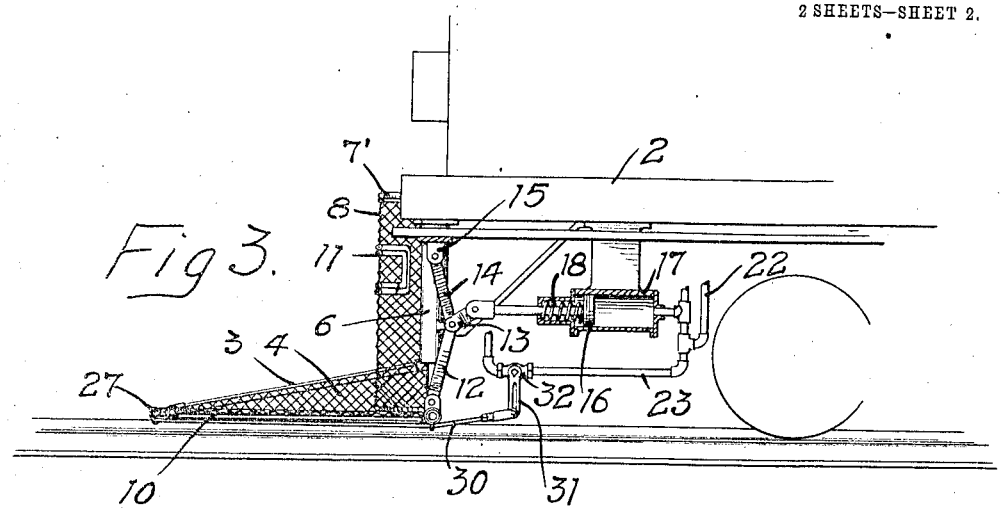
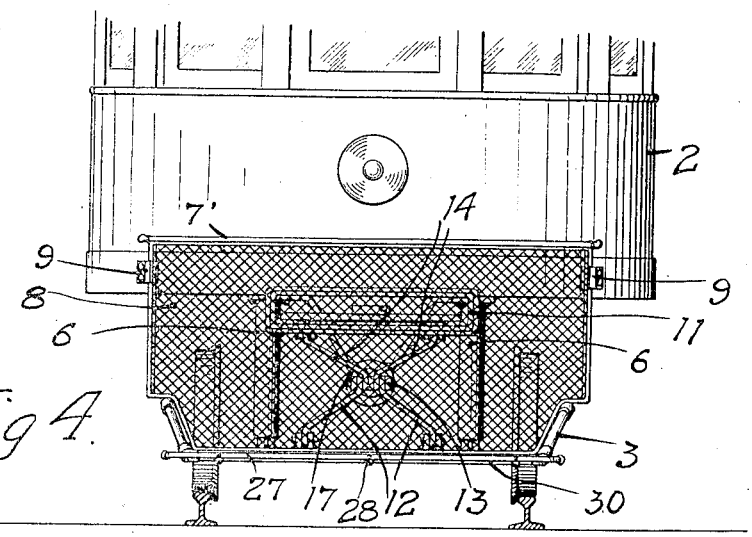
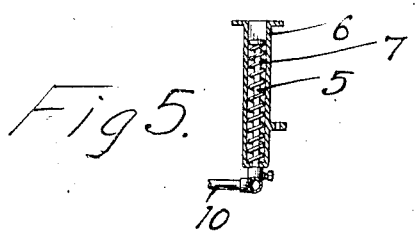
WITNESSES
INVENTOR
FRANK A. NELSON
BY Paul & Paul
HIS ATTORNEYS

UNITED STATES PATENT OFFICE.

FRANK A. NELSON, OF MINNEAPOLIS, MINNESOTA, ASSIGNOR, BY DIRECT AND MESNE ASSIGNMENTS, TO AMERICAN AUTOMATIC FENDER COMPANY, OF MINNEAPOLIS, MINNESOTA, A CORPORATION OF MINNESOTA.

CAR-FENDER.

No. 919,451.      Specification of Letters Patent.      Patented April 27, 1909.

Application filed December 23, 1907. Serial No. 407,626.

*To all whom it may concern:*

Be it known that I, FRANK A. NELSON, of Minneapolis, Hennepin county, Minnesota, have invented certain new and useful Improvements in Car-Fenders, of which the following is a specification.

My invention relates to fenders or life guards of the type shown and described in my pending application No. 403,604, filed November 25, 1907, and the object of the present invention is to simplify the mechanism of the operating parts and provide a fender capable of being raised or lowered, but omitting the folding feature which forms an important part of the type of fender shown in my other application.

The invention consists generally in various constructions and combinations, all as hereinafter described and particularly pointed out in the claims.

In the accompanying drawings, forming part of this specification, Figure 1 is a side elevation of the forward portion of a car showing my invention applied thereto. Fig. 2 is a top view of the same. Fig. 3 illustrates the fender in its lowered or operative position. Fig. 4 is a front elevation showing the fender raised. Fig. 5 is a detail view of one of the plungers which controls the vertical movement of the fender. Fig. 6 is a sectional view illustrating a modified construction.

This invention is applicable to any type of car, motor or engine and propelled from any suitable motive power, and I do not in this application, wish to be confined to the use of the invention on a car of the type shown.

In the drawing, 2 represents the forward portion of a street car on which the fender or car is mounted.

The fender 3 consists of a frame, preferably of gas pipe, supporting a wire fabric 4 of suitable mesh. The rear rail of the frame is provided with plungers 5 that are vertically slidable in cylinders 6 depending from the forward end of the car. Springs 7 within said cylinders normally hold the plungers in their raised position and the fender at the desired elevation from the track. A curved guard or buffer frame 7' having a suitable wire fabric 8 is vertically slidable between guides 9 on the front of the car and is connected with the fender frame by braces 10 and is adapted to slide vertically therewith. This guard frame has a door 11 through which access may be had to the draw bar when it is desired to attach two cars together.

For the purpose of raising the fender, I provide links 12 pivotally connected to the rear rail of the fender at their lower ends and at their upper ends attached pivotally to a coupling 13. Similar links 14 pivotally connect the said coupling with supports 15 on the under side of the car. The said coupling is pivotally attached to a piston 16 arranged within a cylinder 17 that is horizontally suspended under the car body, said piston being normally held in one end of the cylinder by the tension of a spring 18 provided on the stem of said piston. When the fluid pressure is relieved in the cylinder 17, the piston spring will retract the piston, open the toggle joint formed by the links 12 and 14 and the springs within the cylinder 6 put under compression by the downward movement of the fender, will raise it bodily out of contact with the rails.

It will be noted that this fender does not tilt but has a vertical movement bodily from its operative to its inoperative position.

The lever 19 controlling the fluid pressure for operating the brakes is mounted in the usual stand 20 and is connected with the valve usually employed for regulating the flow of the brake operating fluid. A pipe 21 leads from this stand to the brake cylinder (not shown) and the pipe 22 leads from said stand and is connected to a pipe 23 which communicates with the pipe 21 and with the end of the cylinder 17. The pipe 23 also leads to the stand 20 and communicates through a pipe 24 with the fluid pressure reservoir 25. A check valve 26 is provided in the pipe 23 which normally prevents the flow of fluid pressure from the pipe and permits the brakes to be operated under normal conditions without affecting the fender operating mechanism. Whenever desired, however, the controlling lever may be set to allow the air to flow through the pipe 22 into the pipe 23 and from thence into the cylinder and operate the brakes simultaneously with the lowering of the fender. The fluid pressure for the fender and brake cylinders is admitted from the reservoir through the pipes 24 and 23.

It is sometimes desirable to have the fender lowered and the brakes set in case the fender contacts with some object on the track. I provide a rail 27 supported on pins 28 that are slidable in the forward rail of the fender 3 and normally held in a projected position by springs 29. Rods 30 connect the rail 27 with a slotted arm 31 mounted on a valve 32 in the pipe 23. The slotted connection of the rods with the arm 31 allows the vertical movement of the fender. In case the rail 27 contacts with an obstruction on the track, the arm 31 will be oscillated and the valve opened to admit pressure from the reservoir into the pipe 23 and to the fender and brake cylinders. The position assumed by this arm is indicated in Fig. 3, the rail 27 being forced back against the fender to operate the said arm and open the valve.

In Fig. 6 I have illustrated a modified construction which consists in mounting the operating cylinder 33 under the car directly over the fender and connecting the piston 34 to the rear rail of the fender, a spring 35 normally holding the fender in its raised position. The upper end of the cylinder is connected to a pipe 36 leading from the fluid pressure reservoir and through which the pressure is admitted into the cylinder to force down the plunger and lower the fender to the track rails.

I claim as my invention:

1. The combination, with a car, of a vertically sliding fender projecting in front of the same and supported at its rear end only thereon, a horizontal cylinder suspended from the car above and in the rear of said fender, a fluid pressure service pipe connected with said cylinder, a piston for said cylinder and a lever mechanism connecting said piston and said fender.

2. The combination, with a truck frame, of a vertically sliding fender and a fluid-pressure-controlled mechanism for moving said fender to an operative position.

3. The combination, with a truck frame, of a fender supported thereon and having a vertically moving portion adapted to be raised above the track or depressed into contact therewith, and fluid pressure controlled mechanism for depressing said fender.

4. The combination, with a truck frame, of a fender, a guard attached to said fender and projecting vertically therefrom and having a sliding vertical movement with said fender, and means for raising and lowering said fender and guard.

5. The combination, with a car, of a fender supported at its rear end only on the car and having a vertical movement with respect thereto, the rear as well as the forward portions of the fender moving vertically when it assumes an operative or inoperative position, and means for depressing said fender or raising it.

6. The combination, with a car, of a vertically reciprocating fender, cylinders depending from the forward portion of said car, pistons for said cylinders having their stems attached to said fender and springs for normally holding said pistons in their raised position, a fluid pressure cylinder, a piston therefor connected with said fender, a fluid pressure service pipe and a controlling valve connected with said pipe and cylinder.

7. The combination, with a car, of a vertically reciprocating fender, depending cylinders supported on said car, pistons therefor having their rods connected with said fender, springs for normally holding said pistons and fender in their raised position, a fluid pressure cylinder, a piston therefor, toggle levers operatively connecting said piston with said fender and adapted when fluid pressure is admitted to said cylinder to force said fender downwardly against the tension of said springs, a fluid pressure service pipe and a controlling valve for said pipe and cylinder.

8. The combination, with a car, of a vertically reciprocating fender, a cylinder depending therefrom, a piston in said cylinder having its rod connected to said fender, a spring for normally holding said piston and fender in their raised position, a fluid pressure cylinder and service pipe therefor, a piston for said fluid pressure cylinder, means operatively connecting said fluid pressure cylinder piston with said fender whereby when fluid pressure is admitted to said pressure cylinder said fender will be forced downwardly against the tension of its spring, and a valve controlling the admission of fluid pressure to said cylinder.

9. The combination, with a truck frame, of a fender mounted thereon, a fluid pressure controlled mechanism for operating said fender, and means projecting in front of said fender and adapted when struck by an object on the track to render said fluid-pressure-controlled mechanism operative and depress said fender.

10. The combination, with a truck frame, of a fender therefor, a cylinder, a piston therein operatively connected to said fender, a fluid pressure pipe leading into said cylinder, a valve therefor, means projecting in front of said fender and operatively connected to said valve whereby when said means contacts with an object on the track said valve will be operated to admit fluid pressure to said cylinder.

11. The combination, with a car having a fluid pressure brake operating means, of a reciprocating fender, a cylinder depending from said car, a piston for said cylinder having its rod attached to said fender, a spring device for normally holding said piston and fender in their raised position, a fluid pressure cylinder in the rear of said fender, a piston for said pressure cylinder operatively connected with said fender and normally inoperative under the normal fluid pressure for operating the brakes, but becoming operative to move said fender when an emergency pressure is applied to the brakes.

12. The combination, with a car, of cylinders depending therefrom, pistons for said cylinders, a reciprocating fender connected to said pistons and adapted to move vertically therewith, springs for normally holding said pistons and fender in their raised position, toggle links pivotally connected to said car and to said fender, said links being pivotally connected to one another between said fender and car, a fluid pressure cylinder having a service pipe, a piston for said cylinder connected to said toggle links intermediate to their points of attachment to said car and said fender, and a valve controlling the admission of fluid pressure to said pressure cylinder, and the operation of its piston and the depression of said fender, substantially as described.

13. The combination, with a car, of a fender, means connected with the rear portion of said fender and adapted to raise the same out of contact with the track, a lever mechanism connected with said fender and adapted to depress the rear portion thereof toward the track, and a fluid pressure controlled mechanism connected with said lever mechanism for operating the same, substantially as described.

14. The combination, with a truck frame, of a fender supported thereon, and having a vertical reciprocating movement and fluid pressure means for holding said fender against upward movement.

15. The combination, with a car, of a fender adapted to move bodily in a vertical direction to assume an operative or inoperative position, a fluid pressure cylinder having its piston connected with said fender, a fluid pressure brake operating means, said cylinder piston being normally inoperative under the normal fluid pressure for operating the brakes, but becoming operative to move said fender when an emergency pressure is applied to the brakes.

In witness whereof, I have hereunto set my hand this 18th day of December 1907.

FRANK A. NELSON.

Witnesses:
 RICHARD PAUL,
 J. B. BYINGTON.